June 27, 1967  G. C. KREAMER  3,327,926
METALLIC FOIL BAG
Filed Feb. 4, 1966
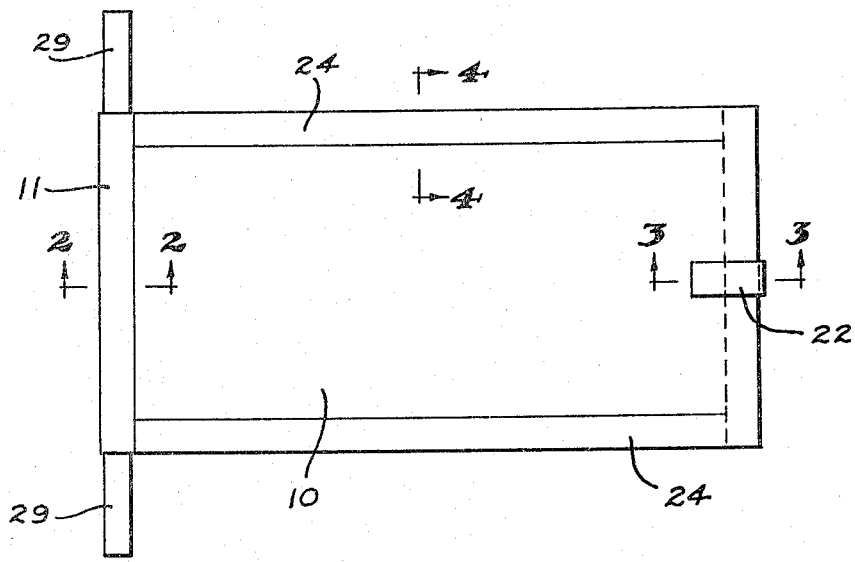
Fig. 1
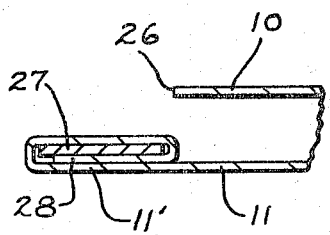
Fig. 2
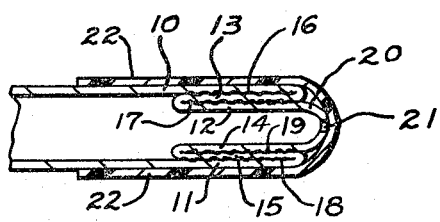
Fig. 3
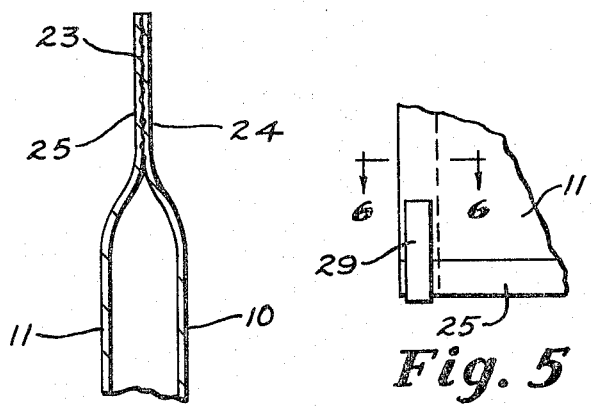
Fig. 4
Fig. 5
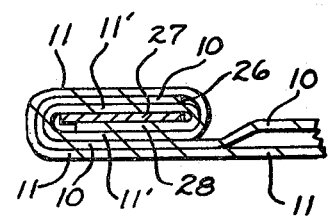
Fig. 6
INVENTOR.
GLENN C. KREAMER
BY Alfred R. Fuchs
ATTORNEY United States Patent Office 3,327,926
Patented June 27, 1967

3,327,926
METALLIC FOIL BAG
Glenn C. Kreamer, Fairway, Kans.
(5632 Norwood, Shawnee Mission, Kans. 66205)
Filed Feb. 4, 1966, Ser. No. 525,173
5 Claims. (Cl. 229—65)

ABSTRACT OF THE DISCLOSURE

A metal foil bag for storage and cooking on a grill or in an oven of frozen or other foods, which has a body portion made of a single sheet or ply, the side edges secured together by continuous welds to close the sides of the bag. This provides an open and a closed end of the bag, the open end being closed by a ductile metal strip that is bent around the bag at its ends after folding. The closed end is folded so as to have two sets of folds one adjacent each of the side walls. The folds extend all the way across the end of the bag and have an outer ply and an inner ply secured to the adjacent side wall and to each other by continuous welds to form a double wall portion adjacent each side wall in the closed end. A single ply web portion extends from and connects the outer ends of the inner plies at the closed end to space the folded portions and provide a passage to a vent opening in the web portion closed by a removable closure strip, that extends transversely across the web portion at the vent opening and is secured face to face to the outer faces of the two side walls at its ends.

My invention relates to metal foil receptacles and more particularly to a metal foil bag.

It is a purpose of my invention to provide a metal foil bag which can be made in varying sizes for either storing or cooking foods. The bag is so made that it will be airtight and leakproof when used for storage purposes. The bag may also be used for cooking purposes either directly on the fire such as on a grill or in the oven, it being so made that it will be vented, if desired, during this cooking operation. By using my improved bag instead of wrapping the food to be cooked in foil, less foil will be used and leakage will be eliminated which would cause the pan or pans in which a foil wrapped food is prepared to become charred and otherwise dirty. It is impossible to wrap meat or vegetables in foil, when butter or some liquid is added for cooking, without leakage taking place, when heat is built up.

My improved metal foil bag is of such a character that it can be used for the preparation of quick frozen foods and the transportation thereof in frozen condition from the place of freezing to the place of sale thereof, and eventually transported to the final user thereof, who can then either store the package in a freezer until ready to be used or use it for cooking the food therein by placing the same over a charcoal or similar barbecue grill, or in the oven. Said bag can also be filled with the food that is to be prepared at the place of use thereof and after being closed placed on a grill or in the oven to cook the contents thereof.

Among the many uses of my improved bag is the cooking of vegetables with the desired butter or cooking fluid and the desired amount of seasoning, directly on a charcoal grill. A similar process can be used for various meats. My improved bag can also be used by carry out restaurants for packaging hamburgers, french fries, chicken, ribs, etc. so that the food will be kept warm until it is delivered to the place of use. If the user thereof is not ready to eat the food at that time, the foil bag can be put in the oven and the food will remain warm until ready to eat.

Food such as scrambled eggs, hamburger, fried potatoes, etc., can be prepared at a camp site by being put in one of my improved bags over the campfire. Canned foods can be similarly heated over a fire. If a freezer is available, the food can be placed in the freezer and frozen until ready for use, and then heated and cooked in the bag in which it was stored in the freezer. Leftover food can be put in one of my metal foil bags and placed in the oven to reheat it.

In order to make my improved metal foil bag suitable for the above referred to purposes it must be of such a character that it will be airtight and fluidtight while the food is stored therein, either in a frozen state or otherwise, and will be fluidtight except for a small vent therein which is opened when the bag is used for cooking the food or heating it sufficiently that vapor or steam will be formed. Furthermore, the means for providing fluidtight joints in the bag must be of such a character that it will withstand the heat of the grill when the bag and its contents are heated in conection with the cooking of the food contained in the bag.

In order to provide a bag that can be used for cooking foods that contain moisture or include a liquid, the above referred to vent must be provided, but the vent must be closed in the case of frozen foods until the cooking operation is carried out. It is accordingly a purpose of my invention to provide a metal foil bag of the above referred to character that is provided with a vent opening and a removable closure member in the form of a closure strip or tab for said vent opening, which is readily removable, to open said vent, when the cooking operation is started.

More specifically my invention comprises a metal foil bag, preferably of aluminum foil, in which the body portion is made of a single sheet or ply of said foil and is folded so as to provide a pair of opposite side walls connected together by a folded end portion integral with the side walls. Said folded end portion is preferably so made that there is a portion connecting the folds in said end portion, which is in such a position that a vent opening can be provided therein, which is accessible, so that it can be readily closed with a readily detachable closure strip or tab extending across said folded end portion. To accomplish this the folds of the folded end portion are provided adjacent each of the side walls of the body portion of the bag and each of said folds comprises an inner and an outer ply, the inner ply being secured face to face to the side wall adjacent which it is located, and the inner and outer plies being secured together face to face, the connecting portion extending between the outer ends of the inner plies.

In order to provide for ready access to the contents of the bag, the end opposite the folded end of said body portion is adapted to be closed by means that can be readily released so that the bag can be filled or emptied through said open end. Said means preferably comprises a ductile metal strip, which is mounted on one of the side walls of the body portion at said open end, the side wall provided with the ductile metal strip thereon being adapted to be folded over the other side wall at said open end so as to provide a closure for the open end of the bag. Said metal strip is preferably provided with extensions that project laterally beyond the outer side edges of the two side wall portions so that it can be folded over against the folded ends of the two side walls and clamp the same in closing position. The clamping ends of the ductile strip can be readily bent back out of clamping position and the folded ends unfolded to open that end of the bag.

In order to provide for fluidtight seams at the joints at the marginal longitudinal edges of the side wall portions, where the same are in engagement face to face, said marginal side wall portions are welded to each other face to face by a suitable welding method that will not destroy the foil. Among such welding methods are what is known as electronic beam welding and ultrasonic welding. The plies that are secured together face to face at the closed folded end portion of the bag, are also secured together by welds that are similarly made. The welds connecting the marginal longitudinal edges of the side walls are continuous so as to provide a fluidtight seal along said longitudinal marginal edges.

Other objects and advantages of my invention will appear as a description of the drawings proceeds. I desire to have it understood however that I do not intend to limit myself to the particular details shown or described except as defined in the claims.

In the drawings:

FIG. 1 is a plan view of the bag in open position.

FIG. 2 is a section on the line 2—2 of FIG. 1 on an enlarged scale.

FIG. 3 is a similar view taken on the line 3—3 of FIG. 1.

FIG. 4 is a similar view taken on the line 4—4 of FIG. 1.

FIG. 5 is a fragmentary plan view showing the bag in closed position and

FIG. 6 is a fragmentary sectional view on an enlarged scale taken on the line 6—6 of FIG. 5.

Referring in detail to the drawings, my improved metal foil bag is made up of a single sheet of metal foil such as aluminum foil which forms the body of the bag. Said bag is provided with a pair of side walls 10 and 11, which are rectangular in outline. The substantially flat rectangular side walls 10 and 11 are connected at one end thereof by means of a closed folded end portion integral with the side walls 10 and 11. To form the closed folded end portion, the same is provided with a pair of folds adjacent the side walls 10 and 11. Each of said folds is made up of a plurality of plies, turned back on themselves, as will be evident from FIG. 3, each fold comprising an inner and an outer ply, the inner ply being spaced from the side wall portion adjacent which the fold is provided and the outer ply being in face to face engagement with said side wall portion.

In FIG. 3 the inner ply of one fold is indicated by the numeral 12 and the outer ply by the numeral 13 while the inner ply of the other fold is indicated by the numeral 14 and the outer ply by the numeral 15. The outer ply 13 is preferably secured in face to face relation with the side wall 10 by means of a weld 16 and the inner ply 12 is secured to the outer ply 13 in a similar manner face to face by means of a weld 17, while the outer ply 15 of the other fold is secured to the side wall 11 face to face by means of a weld 18 and the inner ply 14 is secured to the outer ply 15 face to face by means of a weld 19.

The inner plies 12 and 14 are connected by a connecting web portion 20 so as to space said plies 12 and 14 when the bag is filled with food or other similar materials. A vent opening 21 is provided in the connecting portion 20 and a closure strip or tab 22 is provided for closing said vent opening 21. Said strip 22 may be made of plastic or similar flexible material and is preferably provided with a pressure sensitive adhesive material whereby the strip can be readily secured in sealing position or removed therefrom, the strip being pressed firmly against the connecting portion 20 and the side walls 10 and 11, to seal the vent opening 21, and can be easily pulled off to open the vent.

The longitudinal side edges of the body portion of the bag along the longitudinal marginal edges of the side walls 10 and 11 are secured in flat, face to face engagement as shown in FIG. 4 by means of a continuous weld 23 so as to provide a fluidtight joint between said marginal side edges of said side walls 10 and 11. The marginal side edges of the side wall 10 are indicated by the numeral 24 in the drawings and one marginal side edge portion of the side wall 11 is indicated by the numeral 25 in FIG. 4. Said marginal portions are thus formed into flat seams along the sides of the bag by the welds 23. All the welds in my improved metal foil bag preferably made by an electronic beam or ultrasonic welding method or some other suitable welding method that will not destroy the foil.

The blank from which the bag is made is not folded exactly midway of the length thereof to form the closed folded end portion shown in detail in FIG. 3 but the side wall 11 is somewhat longer than the sidewall 10 so as to provide for an extension 11' thereof beyond the open end edge 26 of said side wall 10. Mounted on said extending portion 11' of the side wall 11 is a flat, ductile metal strip 27, the material of the extension 11' of the side wall 11 being of sufficient length that the same can be wound around the ductile metal strip 27 as shown in FIG. 2, the end edge 28 of said side wall 11 being located between the ductile metal strip 27 and the extension 11' of the side wall 11, which is on the underside of the ductile metal strip as shown in FIG. 2. Thus the extending portion of the side wall 11 completely encloses the ductile metal strip 27. Preferably the ductile metal strip 27 is secured in any suitable manner against movement lengthwise of itself within the pocket formed by the extension 11' of the side wall 11. Said ductile metal strip 27 is of considerably greater length than the width of the side wall 11 and extends beyond the marginal edges of the side walls 10 and 11, when the bag is open, as shown in FIG. 1, said extending portions 29 of said ductile metal strip being adapted to be used to lock the open end of the bag in closed position.

To close the open end of the bag, the ductile metal strip 27, with the end 11' of the side wall 11 wrapped around the same, as shown in FIG. 2, is turned over onto the top or outer side of the side wall 10 and the side wall 10 is rolled or folded around the covered ductile metal strip 27 so as to enclose the ductile metal strip 27 and its covering within a pockett in the end of the side wall 10 as shown in FIG. 6. Then the extending end portions 29 are bent over onto the rolled up ends of the side wall portions as shown in FIG. 5 to clamp the plies of material thereof in bag closing position. To open the bag the end portions 29 are bent back out of clamping position and the end of the sidewall 10 unwrapped from around the end 11' of side wall 11.

What I claim is:

1. A metal foil bag having an integral metal foil body portion providing a pair of opposed side walls connected together at one end thereof by a folded end portion integral with said side walls, said end portion being folded on itself to provide folds in said end portion extending completely across said end portion adjacent each of said side walls, said folds each comprising an outer ply and an inner ply, said outer plies being each secured face to face to the side wall adjacent thereto and said inner plies being secured face to face to said outer plies, and a connecting web portion joining the outer ends of said inner plies, said connecting web portion comprising a single ply exposed at said folded end portion and having a vent opening therein, said inner plies being otherwise free of each other and being spaced from each other from the inner ends thereof to said connecting web portion to provide a passage therebetween leading to said vent opening, means securing the opposed longitudinal marginal portions of said side walls together in fluidtight relation, one of said side walls being longer than the other thereof to provide a portion on said one side wall extending beyond the end of the other side wall that is remote from the said folded end portion, and a ductile metal strip secured to said extending portion, said strip having ends extending laterally beyond the longitudinal marginal edges of said side walls.

2. A metal foil bag as claimed in claim 1 in which said longitudinal marginal portions are secured together face to face by a continuous weld.

3. A metal foil bag as claimed in claim 1 that is provided with a removable closure strip extending transversely across said folded end portion in position to seal said vent opening, said closure strip being secured at its ends face to face to said side walls at opposite ends of said strip and face to face to said connecting web portion.

4. A metal foil bag as claimed in claim 1 in which said outer plies are welded to said adjacent side walls by continuous welds extending across said end portion and said inner plies are welded to said outer plies by continuous welds extending across said end portion.

5. A metal foil bag as claimed in claim 1 in which said longitudinal marginal portions are each secured together face to face by a continuous weld, said outer plies are welded to said adjacent side walls, said inner plies are welded to said outer plies, and a removable closure strip extends across said folded end portion in position to seal said vent opening.

References Cited
UNITED STATES PATENTS

| | | |
|---|---|---|
| 2,745,754 | 5/1956 | Steinbock. |
| 2,821,337 | 1/1958 | Morgan _____ 229—57 |
| 3,143,277 | 8/1964 | La Fleur _____ 229—57 |
| 3,159,096 | 12/1964 | Tocker. |
| 3,185,372 | 5/1965 | Ferraro. |

JOSEPH R. LECLAIR, *Primary Examiner.*

DAVID M. BOCKENEK, *Examiner.*